United States Patent
Koga et al.

(10) Patent No.: US 9,695,933 B2
(45) Date of Patent: Jul. 4, 2017

(54) AUTOMATIC TRANSMISSION CONTROL DEVICE

(71) Applicant: Nissan Motor Co., Ltd., Yokohama-shi, Kanagawa (JP)

(72) Inventors: Masato Koga, Kanagawa (JP); Atsushi Tsukizaki, Kanagawa (JP); Kenichi Mori, Kanagawa (JP); Ryohey Toyota, Kanagawa (JP); Takashi Kurita, Kanagawa (JP); Kazuhiro Takaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/025,290

(22) PCT Filed: Oct. 23, 2014

(86) PCT No.: PCT/JP2014/078191
§ 371 (c)(1),
(2) Date: Mar. 28, 2016

(87) PCT Pub. No.: WO2015/068584
PCT Pub. Date: May 14, 2015

(65) Prior Publication Data
US 2016/0230881 A1  Aug. 11, 2016

(30) Foreign Application Priority Data

Nov. 6, 2013  (JP) .................................. 2013-230680

(51) Int. Cl.
*F16H 61/04* (2006.01)
*F16H 3/089* (2006.01)

(52) U.S. Cl.
CPC ......... *F16H 61/0403* (2013.01); *F16H 3/089* (2013.01); *F16H 61/04* (2013.01);
(Continued)

(58) Field of Classification Search
None
See application file for complete search history.

(56) References Cited

U.S. PATENT DOCUMENTS

| 8,960,034 B2 | 2/2015 | Takahashi | |
| 2003/0203790 A1* | 10/2003 | Matsubara | B60W 10/06 477/107 |
| 2013/0244831 A1* | 9/2013 | Hiasa | F16H 61/04 477/79 |

FOREIGN PATENT DOCUMENTS

| EP | 0 641 959 A2 | 3/1995 |
| JP | 2001-90826 A | 4/2001 |

(Continued)

*Primary Examiner* — Edwin A Young
(74) *Attorney, Agent, or Firm* — Global IP Counselors, LLP

(57) ABSTRACT

An automatic transmission control device with which it is occurrence of meshing failure at the time of engaging an engagement clutch may be prevented while suppressing prolonged time for completing the engagement. Disclosed is an automatic transmission control device comprising: an automatic transmission that is provided in the drive system of a vehicle and that includes, as an coupling element, an engagement clutch which undergoes meshing/engagement at the time of coupling; and a transmission controller that performs transmission control of the automatic transmission. The engagement clutch includes: a clutch gear connected to a transmission input shaft; and a clutch hub connected to a transmission output shaft and capable of meshing with the clutch gear. At the time of shifting at which the engagement clutch is engaged, the transmission controller sets a target differential rotation speed for generating a predetermined differential rotation between the input rotation speed and the output rotation speed in the engagement clutch when the clutch gear and the clutch hub mesh with each other.

11 Claims, 7 Drawing Sheets

(52) U.S. Cl.
CPC ............... *F16H 2061/047* (2013.01); *F16H 2061/0418* (2013.01); *F16H 2306/48* (2013.01)

(56) References Cited

FOREIGN PATENT DOCUMENTS

| | | |
|---|---|---|
| JP | 2005-114107 A | 4/2005 |
| JP | 2006-38136 A | 2/2006 |
| JP | 2007-278487 A | 10/2007 |
| JP | 2008-75718 A | 4/2008 |
| JP | 2014-105826 A | 6/2014 |
| WO | 2010/119504 A1 | 10/2010 |
| WO | 2012/127655 A1 | 9/2012 |
| WO | 2013/076218 A1 | 5/2013 |

\* cited by examiner

AUTOMATIC TRANSMISSION CONTROL DEVICE

CROSS-REFERENCE TO RELATED APPLICATIONS

This application is a U.S. National Stage Application of International Application No. PCT/JP2014/078191, filed Oct. 23, 2014, which claims priority to Japanese Patent Application No. 2013-230680 filed in the Japan Patent Office on Nov. 6, 2013, the contents of each of which is hereby incorporation herein by reference.

BACKGROUND

Field of Invention

The present invention relates to an automatic transmission control device equipped with an automatic transmission having an engagement clutch disposed in a vehicle drive system and performing a meshing engagement as an engagement element.

Background Information

Conventionally, in an automatic transmission having an engagement clutch which is subject to meshing engagement, such an automatic transmission, a control device is known in which an input side rotation speed of the engagement clutch is synchronized with and an output side rotation speed thereof (for example, see Patent JP 2001-90826 A).

SUMMARY

However, in the conventional control device for an automatic transmission, at the time of coupling the engagement clutch, due to the synchronization process between the input side rotation speed and the output side rotation speed, depending on the positional relation of an input side clutch gear relative to an output side clutch hub during synchronization, a situation may arise in which the engagement clutch cannot be coupled or engaged so that so-called "meshing failure" occurs. More specifically, when the input side clutch teeth are synchronized in a rotation speed with the output side clutch teeth in the opposing state, the opposing clutch teeth are in contact with each other and thus are incapable of meshing. In order to cope with this situation, it is necessary to temporarily generate a differential rotation to thereby shift the relative position of the opposing teeth and resume a meshing operation. Thus, the time until engagement completion is increased.

The present invention has been made in consideration of the above problems, and, aims to provide an automatic control device in which the meshing failure of the engagement clutch may be prevented from occurring and the time until engagement completion may be prevented from being increased.

In order to achieve the aim described above, an automatic transmission control device according to the present invention, and an automatic transmission having an engagement clutch disposed in a vehicle drive system and operative in meshing engagement as a coupling element and a shift controller that executes a shift control of the automatic transmission are respectively provided.

Further, the engagement clutch includes a first engagement member connected to a transmission input shaft and a second engagement member connected to a transmission output shaft and capable of meshing with the first engagement member.

Further, the shift controller is configured, when engaging the engagement clutch for shifting, such that, when the first engagement member and the second engagement member mesh each other, a target differential rotation speed is set with a predetermined differential rotation between the input rotation speed representative of the rotation speed of the first engagement member and the output rotation speed representative of the rotation speed of the second engagement member.

Therefore, in the automatic transmission control device according to the present invention, when engaging the engagement clutch for shifting, the shift controller is configured, when the first engagement member and the second engaging member mesh with each other, such that a target differential rotation speed is set to provide a predetermined differential rotation of the engagement clutch between the input rotation speed and the output rotation speed.

Thus, at the timing when the first and the second engagement members mesh each other, the relative position between the teeth of the first engagement member and the teeth of the second engagement member continues to change. Therefore, even when the teeth of the first engagement member and the teeth of the second engagement member are opposed to each other, the relative positional relationship between both will be shifted quickly. Therefore, the situation may be avoided in which the teeth of the first engagement member and the teeth of the second engagement member continue to be in contact while facing each other so that the meshing failure in which the first and the second engagement members fail to mesh each other may be prevented from occurring.

Also, since it is possible to prevent the occurrence of the meshing failure, the trouble may be avoidable to resume meshing operation after shifting the relative position between the first and the second engagement members. As a result, it is possible to prevent the time until engagement completion of the engagement clutch from being prolonged.

BRIEF DESCRIPTION OF THE DRAWINGS

Referring now to the attached drawings which form a part of this original disclosure.

DETAILED DESCRIPTION OF THE EMBODIMENTS

Below, a description is given of embodiments for implementing a control device of an automatic transmission according to the present invention with reference to a first embodiment shown in the accompanying drawings.

First Embodiment

First, a description is made of the configuration.

The configuration of a shift control device mounted in an electric vehicle (an example of a vehicle) in the first embodiment is described in "the overall system configuration", "detailed configuration of a shift control system" and "shift control processing configuration", separately.

Overall System Configuration

Figure 1:
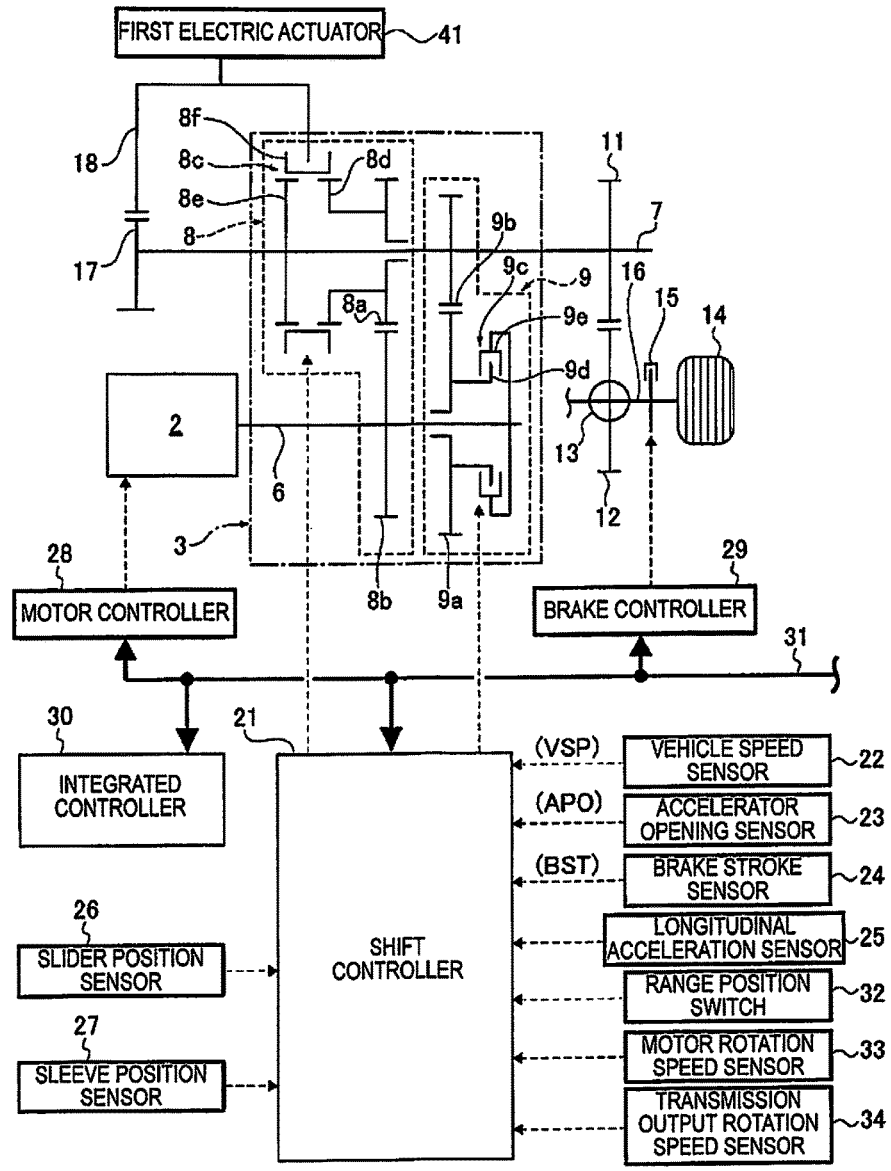
FIG. 1 is an overall system block diagram showing a drive system configuration and a control system configuration of an electric vehicle (an example of an electrically driven vehicle) to which an automatic transmission control device of a first embodiment is applied.

FIG. 1 shows a drive system configuration and a control system configuration of an electric vehicle to which the shift control device in the first embodiment is applied. Below, with reference to FIG. 1, the overall system configuration is described.

As the drive system configuration of the electric vehicle (vehicle), as shown in FIG. 1, a driving motor generator 2, an automatic transmission 3, and a drive wheel 14 are provided.

The driving motor generator 2 is a permanent magnet synchronous motor of three-phase alternating current and serves as a driving source for travel of the electric vehicle. The driving motor generator 2, when a positive torque (driving torque) command is output to the inverter (not shown) from a motor controller 28, generates a driving torque using a discharge power from a high voltage battery (not shown) so as to carry out a driving operation to drive the drive wheels 14 (power running). On the other hand, when a negative torque (generation torque) command is output to the inverter from the motor controller 28, a power generating operation for converting rotational energy from the drive wheels 14 into electrical energy is performed, and the power thus generated is used as charging electric power in the high voltage battery (regeneration). Then, a motor shaft of the driving motor generator 2 is connected to a transmission input shaft 6 of the automatic transmission 3.

The automatic transmission 3 is a constant mesh-type stepped transmission which transmits power in one of two gear pairs of different transmission or speed ratios, in which two stage shifting is performed, and including a high gear stage (high speed stage) with a low speed reduction ratio and a low gear stage with high speed reduction ratio. The automatic transmission 3 is used for gear shifting when outputting a motor power by passing from the driving motor generator 2 through a transmission input shaft 6 and a transmission output shaft 7 and is configured by a low side transmission mechanism 8 for realizing a low shift stage and a high side transmission mechanism 9 for realizing a high shift stage. Note that the transmission input shaft 6 and the transmission output shaft 7 are disposed parallel to each other.

The low side shift mechanism 8 is used for selecting a low-side transmission path at the time of outputting the motor power and is disposed on the transmission output shaft 7. The low side shift mechanism 8 includes an engagement clutch 8c (meshing element) which performs a meshing engagement/release of a gear 8a with respect to the transmission output shaft 7 in order for the low speed stage gear pair 80 (gear 8a, gear 8b) to drivingly connect between the transmission input shaft 6 and the transmission output shaft 7. Here, the low speed stage gear pair 80 is composed of the gear 8a rotatably supported on the transmission output shaft 7 and the gear 8b which is meshed with the gear 8a and rotates jointly with the transmission input shaft 6.

The high-side transmission mechanism 9 is intended, when outputting the motor power, for selecting a high-side transmission path and is arranged on the transmission input shaft 6. This high-speed side shift mechanism 9 includes a friction clutch 9c (engagement element) which performs a frictional engagement/release of a gear 9a with respect to the transmission input shaft 6 in order for the high speed stage gear pair 90 (gear 9a, gear 9b) to drivingly connect between the transmission input shaft 6 and the transmission output shaft 7. Here, the high speed stage gear pair is composed of the gear 9a rotatably supported on the transmission input shaft 6 and the gear 9b which is meshed with the gear 9a and rotates jointly with the transmission output shaft 7.

The transmission output shaft 7, with a gear 11 fixed thereto, and through a final drive gear set composed of the gear 11 and a gear 12 meshed therewith, is configured to drivingly connect a differential gear unit 13 to the transmission output shaft 7. Further, a drive shaft 16 connected to a drive wheel 14 is coupled to the differential gear unit 13. Thus, the motor power of the driving motor generator 2, which has reached the transmission output shaft 7 is configured to be further transmitted via the final drive gear set 11, 12, the differential gear unit 13, and the left and right drive shaft 16 to the drive wheels 14 (only one of the drive wheels is shown in FIG. 1).

Further, a parking gear 17 is fixed to the transmission output shaft 7 in the side opposite to the gear 11, and a parking pole 18 is arranged on a transmission case (not shown) so as to be able to be meshed with the parking gear 17. In other words, when selecting a P range position, by allowing the parking pole 18 to mesh with the parking gear 17 by the first electric actuator use commonly for the engagement clutch 8c, the transmission output shaft 7 is fixed to the transmission case so as to be unrotatable.

As the control system configuration of the electric vehicle, as shown in FIG. 1, a shift controller 21, a vehicle speed sensor 22, an accelerator opening sensor 23, a brake stroke sensor 24, a longitudinal acceleration sensor 25, a slider position sensor 26, a sleeve position sensor 27, a motor rotation speed sensor 33, a transmission output rotation speed sensor 34, and the like are provided. In addition, a motor controller 28, a brake controller 29, an integrated controller 30, a CAN communication line 31, and a range position switch 32 are provided.

The shift controller 21 is composed of a microcomputer including a CPU (Central Processing Unit), a ROM (Read Only Memory), a RAM (Random Access Memory), a backup memory, and an I/O interface. The shift controller 21 outputs a shift command or request based on a shift map (not shown), and is further configured, when upshifting to a high gear stage in a state of low gear stage with the engaging clutch 8c in engaged state and the friction clutch 9c released, to perform a switching control to release the engaging clutch 8c and to frictionally connect the friction clutch 9c. Also, when downshifting to a low gear stage in a state in which the engaging clutch 8c is released and the friction clutch 9c is frictionally engaged, the shift controller 21 performs a switching control to carry out meshing engagement of the engagement clutch 8c and release of the friction clutch 93. Further, at the time of downshifting, a shift control processing is executed as described below and the meshing engagement of the engagement clutch 8c will be controlled.

The range position switch 32 is intended to be a switch which detects a range position of the automatic transmission 3, which has been selected in response to a driver's selecting operation with respect to a select lever (not shown). The positions detectable are P range (i.e. parking, non-driving, or parking range9, N range (i.e. neutral range), D range (i.e. drive range, forward driving range), R range (i.e. reverse range, reverse driving range), and the like.

The motor rotation speed sensor 33 is intended to be a sensor for detecting an output rotation speed of the driving motor generator 2. Specifically, the rotation speed of the transmission input shaft 6 is detected. That is, the rotation speed of the transmission output shaft 7 corresponds to an output rotation speed (hereinafter, referred to as "clutch output rotation speed") of the engagement elements (engagement clutch 8c, friction clutch 9c) provided in the automatic transmission. The transmission output rotation speed sensor 34 detects the clutch output rotation speed.

Detailed Configuration of Speed Control System

Figure 2:
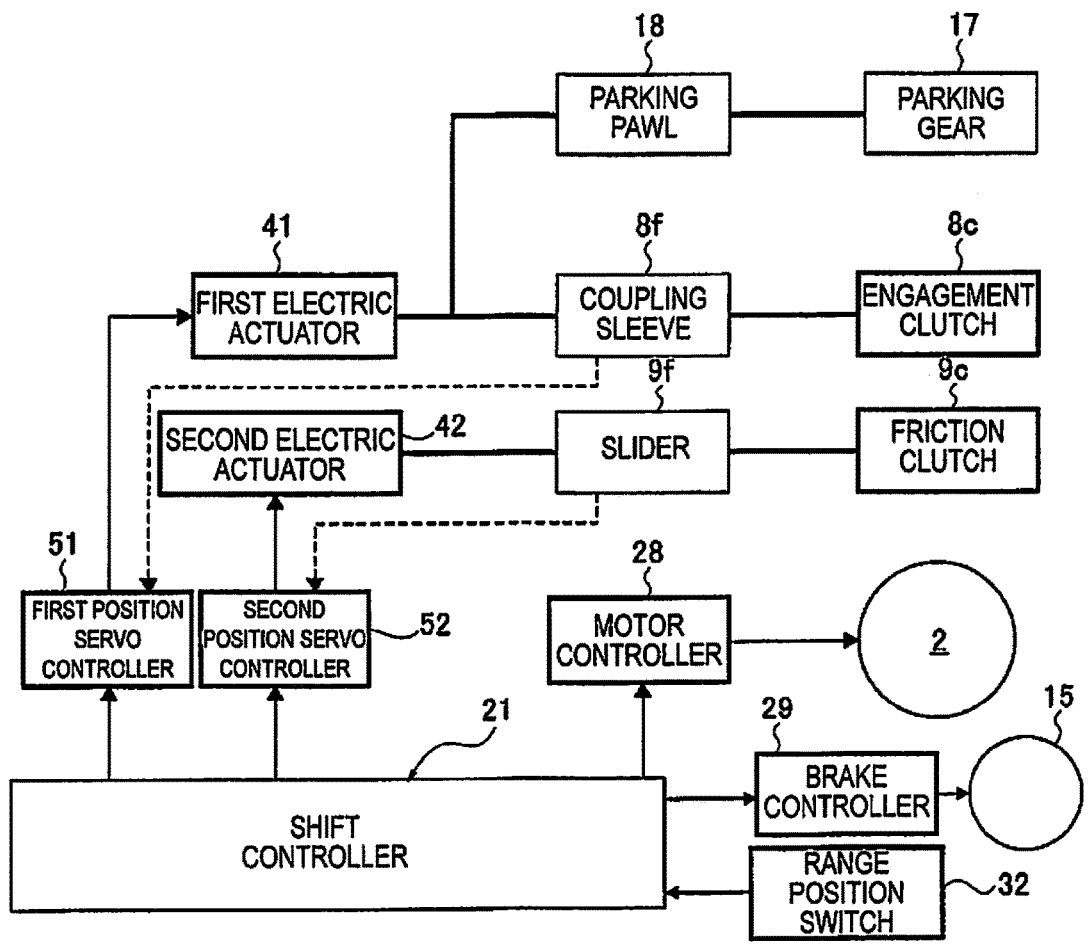
FIG. 2 is a control block diagram showing a detailed configuration of a shift control system of the first embodiment.

FIG. 2 shows a detailed configuration of a shift control system of the first embodiment. FIG. 3 is an explanatory diagram of the engagement clutch of the first embodiment. Below, with reference to FIGS. 2 and 3, a detailed configuration of the shift control system in the first embodiment is described.

As a configuration of the shift control system of the control system of the electric vehicle, as shown in FIG. 2, an engagement clutch 8c, a friction clutch 9c, a parking gear 17, a driving motor generator 2, a hydraulic brake 15, a shift controller 21 are provided. Specifically, the engagement clutch 8c, the friction clutch 9c, the driving motor generator 2, and the hydraulic brake 15 are subject to control, and depending on conditions, control is executed based on a request from the shift controller 21.

The engagement clutch 83 is constructed in a clutch of synchronous meshing type, and includes a clutch gear 8d (first engagement member) disposed on the gear 8d and a clutch hub (second engagement member) 8e attached to the transmission output shaft 7, and a coupling sleeve 8f (see FIG. 1). Further, by driving the coupling sleeve 8f in stroke by the first electric actuator 41, meshing engagement/release between the clutch gear 8d and the clutch hub 8e is performed via the coupling sleeve 8f. Note that, since the gear 8a is meshed with the gear 8b jointly rotatable with the transmission input shaft 6, the clutch gear 8d disposed on the gear 8a is coupled to the transmission input shaft 6. In other words, when the clutch gear 8d and the clutch hub 8e are engaged by meshing, the transmission input shaft 6 and the transmission output shaft 7 are coupled.

The meshing engagement or release of the engagement clutch 8c is determined by the position of the coupling sleeve 8f. Thus, the shift controller 21 reads the value of the sleeve position sensor 27 and includes a first position servo controller 51 (for example, position servo system with PID control) which provides a current to the first electric actuator 41, so that the position of the coupling sleeve 8f is located in the meshing engagement position or the release position.

Further, when the coupling sleeve 8f is in meshed engagement position shown in FIG. 1, where the coupling sleeve 8f is meshed with the outer periphery clutch teeth of both clutch gear 8d and those of the clutch hub 8e, the gear 8a is drivingly connected to the transmission output shaft 7. On the other hand, when the coupling sleeve 8f is in a non-meshing position with the outer periphery clutch teeth of one of the clutch gear 8d and the clutch hub 8e, the gear 8a is released from the transmission output shaft 7.

Furthermore, with reference to FIG. 3A to FIG. 3E, a description is added of the synchronization mechanism of the engagement clutch 8c. The coupling sleeve 8f is formed in a cylindrical shape with both ends open and including at its inner periphery, a plurality of spline portions 8fa constantly fit with clutch teeth (not shown) of the clutch gear 8d (see FIG. 1). Further, while maintaining a fitting state between the clutch teeth of the clutch gear 8d and the spline portions 8fa, the coupling sleeve 8f is supported movably axially, i.e., in the left-right direction in FIG. 3A. The axial movement of the coupling sleeve 8f is made by driving the first electric actuator 41 (see FIG. 2).

The clutch hub 8e includes a plurality of clutch teeth 8ea on the outer periphery thereof, which may be fit into the spline portions 8fa formed on the inner periphery of the coupling sleeve 8f. That is, the clutch teeth 8ea of the clutch hub 8e will be engageable with the clutch teeth of the clutch gear 8d (not shown) via the coupling sleeve 8f.

Furthermore, in the clutch hub 8e, the outer periphery of a tapered cone portion 8eb is fitted with a synchronizer ring 8g movably in the axial direction.

The synchronizer ring 87 is formed with a plurality of synchro-teeth 8ga which can mesh with a plurality of the spline portions 8fa of the coupling sleeve 8f and key grooves 8gc which constantly mesh with keys 8h provided on the coupling sleeve 8f. A gap is disposed between the key 8h and the key groove 8gc. The synchronizer ring 8g is configured to be movable in the rotational direction relative to the coupling sleeve 8f by the amount of the gap between the key 8h and the key groove 8gc.

Now, a description will be given of the synchronizing operation of the synchronization mechanism with respect to the engagement clutch 8c when changing from a released state to the engaged or meshed connection. In the engagement clutch 8c, when changing to the engaged connection from the released state, the coupling sleeve 8f presses the synchronizer ring 8g in the axial direction so as to approach the clutch hub 8e. As a result, due the resulting friction force between the synchronizer ring 8g and the cone portion 8eb, the coupling sleeve 8f and the clutch hub 8e are connected to rotate in synchronization.

Figure 3A:
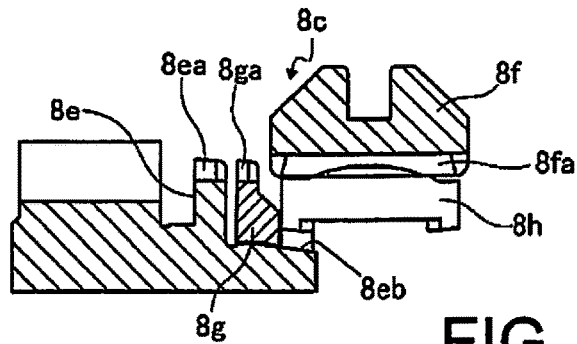
FIG. 3A is an explanatory view showing an essential part cross section of the engagement clutch of the first embodiment.

In other words, by moving the coupling sleeve 8f by the first electric actuator 41 (see FIG. 2) axially, as shown in FIG. 3A, together with the key 8h, in a direction to be close to the clutch hub 8e, the synchronizer ring 8g is pressed against the cone portion 8eb.

Figure 3B:
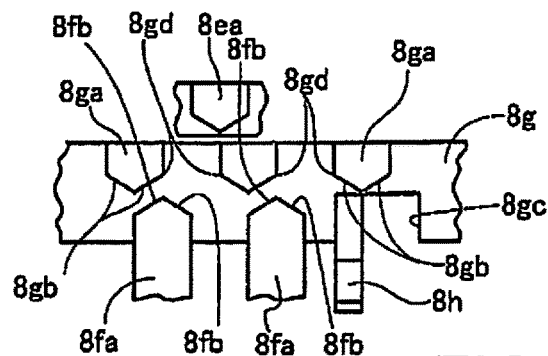
FIG. 3B is a view showing the essential part shown in FIG. 3A as seen from the upper side of the engagement clutch shown in FIG. 3A for illustrating a state immediately before engagement.

When the synchronizer ring 8g is pressed against the cone portion 8eb, because relative rotation is occurring between both components, the synchronizer ring 8g rotates only by the gap or clearance of the key groove 8gc shown in FIG. 3B. Thus, a chamfer portion 8gb of the synchro-teeth 8ga of the synchronizer ring 8g and a chamfer portion 8fb of the spline portion 8fa of the coupling sleeve 8f, as shown in FIG. 3B, are brought into an index state, i.e., facing each other when viewed in the axial direction.

Figure 3C:
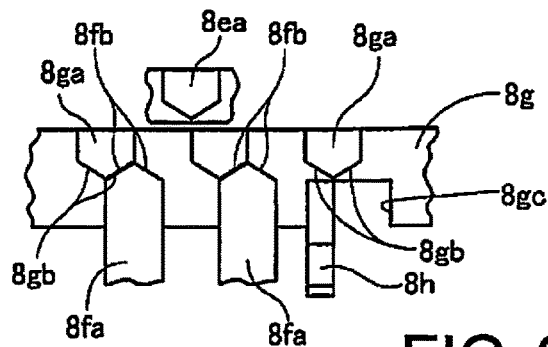
FIG. 3C is a view showing the essential part shown in FIG. 3A as seen from the upper side of the engagement clutch shown in FIG. 3A for illustrating a state in which a chamfer portion is contact during the rotational synchronization.

By moving the coupling sleeve 8f further in the direction of the clutch hub 8e side from the index state, as shown in FIG. 3C, both chamfer portions 8fb, 8gb are brought into contact each other. Thus, the synchronizer ring 8g further presses the cone portion 8eb to generate the friction torque so that the synchronizer ring 8g, the coupling sleeve 8f, and the clutch hub 8e are synchronized. At this time, the synchronizer ring 8g rotates in the circumferential direction such that the spline portion 8fa is to mate with synchro-teeth 8ga.

Figure 3D:
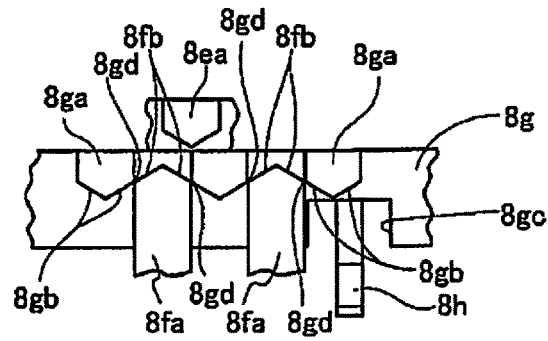
FIG. 3D is a view showing the essential part shown in FIG. 3A as seen from the upper side of the engagement clutch shown in FIG. 3A for illustrating a state in which a chamfer portion is free from contact during the rotational synchronization.

As shown in FIG. 3D, when the coupling sleeve 8f passes a reverse taper angle 8gd of the synchronizer ring 8g, the rotation synchronization between the coupling sleeve 8f and synchronizer ring 8g is established.

Figure 3E:
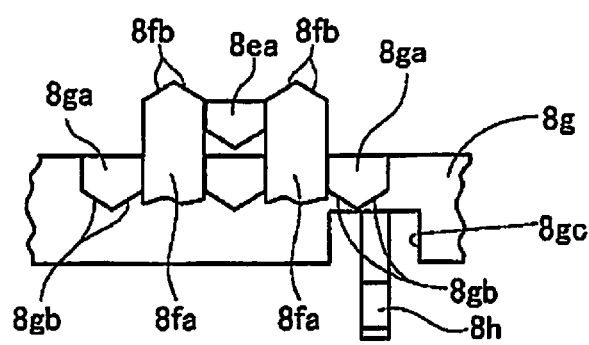
FIG. 3E is a view showing the essential part shown in FIG. 3A as seen from the upper side of the engagement clutch shown in FIG. 3A for illustrating a state of completion of rotational synchronization.

When this rotation synchronization is established, while the friction torque between the synchronizer ring 8g and the cone portion 8eb disappears, the coupling sleeve 8f moves further axially while holding the key 8h stand-by. As a result, the spline portion 8fa of the coupling sleeve 8f pushes aside the clutch teeth 8ea of the clutch hub 8e, so as to be meshed with the clutch teeth 8ea of the clutch hub 8e, as shown in FIG. 3E. Thus, the engagement clutch 8c is brought into a meshed engagement state.

The friction clutch 9c includes a driven plate 9d which rotates together with the gear 9a, and a drive plate 9e which rotates together with the transmission input shaft 6 (see FIG. 1). Further, by driving a slider 9f to impart a pressing force to both plates 9d, 9e by a second electric actuator 42, the frictional engagement/release is performed.

The transmission torque capacity of the frictional clutch 9c is determined by a position of the slider 9f. Also, the slider 9f is a screw mechanism, so that, when the input of the second electric actuator 42 is 0 (zero), the position is configured to be held. The shift controller 21 reads the value of the slider position sensor 26 and includes a second position servo controller 52 (for example, position servo system by PID control) so that a slider position for obtaining a desired transmission torque capacity may be achieved.

Further, the friction clutch 9c rotates jointly with the transmission input shaft 6, and drivingly connects the gear 9a to the transmission input shaft 6 when frictionally engaged, and, when releasing, separates the drive connection between the gear 9a and the transmission input shaft 6.

The parking gear 17, when selecting the P range position (non-driving range position), the first electric actuator 41 which also serves for the engagement clutch 8c causes the parking pawl 18 to be meshed, so that the transmission output shaft 7 is fixed to or non-rotatable relative to the case. That is, the first electric actuator 41 manages three operational positions selectively, i.e., the engagement position of the engagement clutch 8c, a non-engagement position of the engagement clutch 8c, and the engagement position of the parking gear 17.

The motor generator 2 is placed under a torque control or rotation speed control by a motor controller 28 which receives a command output from the shift controller 21. In other words, when the motor controller 28 receives a motor torque request, control, or an input-output rotation synchronization request from the shift controller 21, in response to these requests, the driving motor generator 2 will be placed under the torque control or the rotation speed control.

The hydraulic brake 15 is increased in the braking engagement force by a pump-up operation by a brake hydraulic pressure actuator (not shown) which receives a driving request from the brake controller 29 which in turn receives a request from the shift controller 21.

Shift Control Processing Configuration

Figure 4:
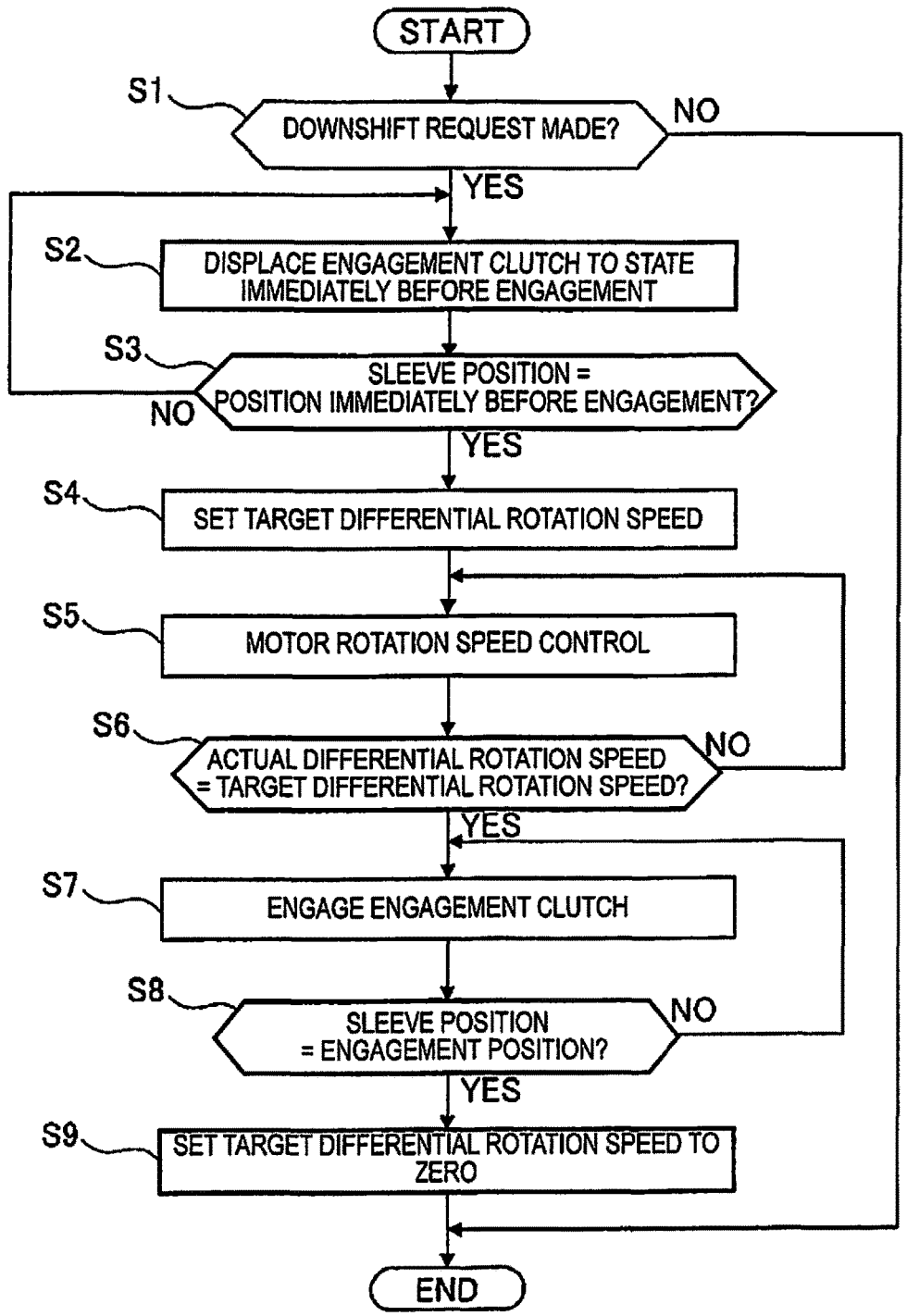
FIG. 4 is a flowchart showing a flow of shift control process executed by a shift controller in the first embodiment.

FIG. 4 shows a flow of a shift control process executed by the shift controller in the first embodiment. Below, based on FIG. 4, a description is given of each step representing a shift control processing configuration.

Note that this process is executed in the automatic transmission 3 in response to a shift request being made.

In step S1, it is determined whether or not a downshift request from a high gear stage to a low gear stage has been generated. When YES (downshift request present), control proceeds to step S2, while, if NO (no downshift request), the shift control process shown in FIG. 4 will not be performed and control ends.

Here, the downshift request is output, on the shift map (not shown) which is set based on the accelerator opening and the vehicle speed, when an operating point determined by the accelerator opening and the vehicle speed crosses a downshift line.

In step S2, following the determination that the downshift request is present in step S1, the coupling sleeve 8f of the engagement clutch 8c starts a stroke drive by the first electric actuator 41. Subsequently to the coupling sleeve being displaced immediately before engagement position of the engagement clutch 8c, control proceeds to step S3.

Here, "a position immediately before engagement of the engagement clutch 8c", is intended to refer to a position in which the tip position of the spline portion 8fa on the clutch hub side of the coupling sleeve 8f into which the clutch gear 8d fits is positioned immediately before the overlapping with the synchro-teeth 8ga of the synchronizer ring 8g. In other words, the position in which the distance between the clutch hub side tip of the spline portion 8fa and the synchro-teeth 8ga assumes a very small predetermined value refers to the "position immediately before engagement of the engagement clutch 8c".

In step S3, following the stroke engagement of the coupling sleeve 8f of the coupling in step S2, the determination is made whether or not the position of the coupling sleeve 8f has reached a position immediately before engagement. If YES (i.e., sleeve position=position immediately before engagement), control proceeds to step S4. If NO (i.e., sleeve position ≠ position immediately before engagement), it is determined that the coupling sleeve 8f is insufficient in stroke drive, and process returns to step S2.

Here, the position of the coupling sleeve 8F is detected by the sleeve position sensor 27. Further, once the coupling sleeve 8f has reached the position before engagement, this position is maintained.

In step S4, following the determination that the sleeve position is equal to the position immediately before engagement, a target differential speed to impart a predetermined differential rotation speed is set between the rotation speed of the clutch gear 8d and the rotation speed of the clutch hub 8e. Then control proceeds to step S5.

Here, the "target differential rotation speed to impart a predetermined differential rotation speed", is intended to refer a very small rotational speed difference which would not remain the clutch teeth 8ea of the clutch hub 8e and the spline portion 8fa of the coupling sleeve 8f to be opposed to each other. In other words, the rotational speed difference is set such that, even when the clutch teeth 8ea and the spline 8fa are opposed to each other, the relative position of both components is shifted promptly to engage or mesh each other.

Figure 5:
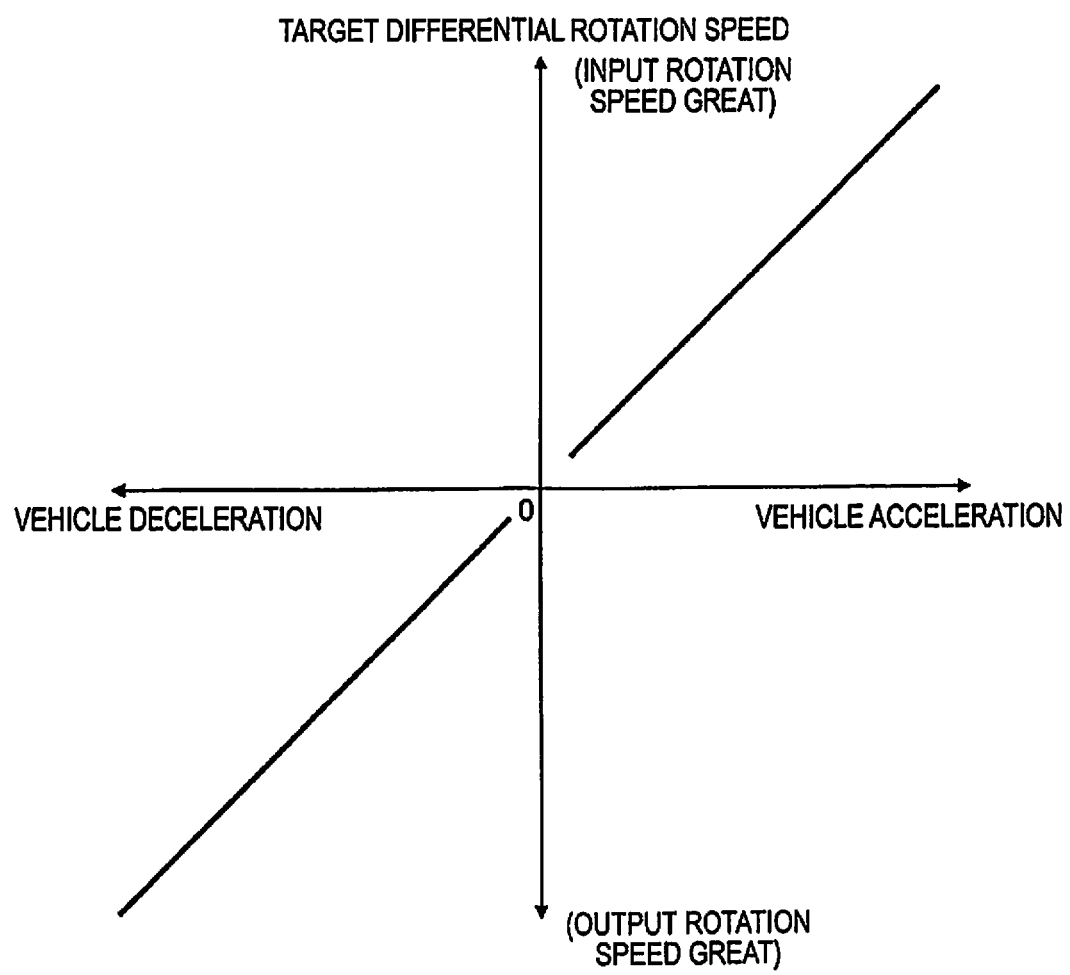
FIG. 5 is a diagram showing an example of a target differential rotation speed setting map.

In addition, the target differential speed is set, with reference to a map shown in FIG. 5, according to a vehicle speed detected by a vehicle speed sensor 22 and vehicle acceleration or vehicle deceleration detected by a longitudinal acceleration sensor 25.

More specifically, when the vehicle is accelerating, the rotation speed of the clutch gear 8d representative of a clutch input rotation speed is higher than the rotation speed of the clutch hub 8e representative of the clutch output rotation speed. In addition, as the vehicle acceleration increases, the target differential rotation speed is greater.

Further, when the vehicle is decelerating, the target differential rotation speed is such that the rotation speed of the clutch gear 8d will be lower than the rotation speed of the clutch hub 8e. In addition, as the vehicle deceleration increases, the target differential rotation speed is greater.

In step S5, following the target differential rotation speed setting in step S4, the rotation speed (motor rotation speed) of the driving motor generator 2 representative of the input rotation speed of the automatic transmission is controlled, and control proceeds to step S6.

Thus, the input-side rotation speed of the engagement clutch 8c changes, and the differential rotation speed (difference in rotation speed between the rotation speed of the clutch gear 8d and the rotation speed of the clutch hub 8e) at the engagement clutch 8c will be controlled. Note that the motor speed control is performed by a feedback control based on the detected values of the motor rotation speed sensor 33 and transmission output speed sensor 34.

In step S6, following the motor speed control in step S5, it is determined whether or not the actual rotation speed difference of the engagement clutch 8c has reached the target rotation speed difference that was set in step S4. If YES (actual rotation speed difference=target differential rotation speed), the control proceeds to step S7. If NO (the actual rotation speed difference≠target difference rotation speed), control returns to step S5.

In step S7, following the determination of the actual rotational speed difference being equal to the target difference rotation speed in step S6, in the engagement clutch 8c, the coupling sleeve 8f is allowed to stroke driven by the first electric actuator 41. Then, after the coupling sleeve 8f is displaced to a position of meshing with the clutch hub 8e, control proceeds to step S8.

In step S8, following the stroke drive of the coupling sleeve 8f in step S7, it is determined whether or not the position of the coupling sleeve 8f has reached the engagement position. If YES (the sleeve position=meshing position), control proceeds to step S9. If NO (sleeve position≠engagement position), it is determined that there is not enough stroke drive for the coupling sleeve 8f, control returns to step S7.

The position of the coupling sleeve 8f is detected by the sleeve position sensor 27.

In step S9, following the determination of the sleeve position being equal to the engagement position in step S8, the target differential speed for engaging the clutch 8c is set to zero, and at the same time, the motor speed control is performed to achieve the target motor differential rotation speed. Subsequently, control ends.

Now, a description is given of the "engagement clutch engagement operation" in the automatic transmission control device in the first embodiment.

Engagement Clutch Engagement Operation

Figure 6:
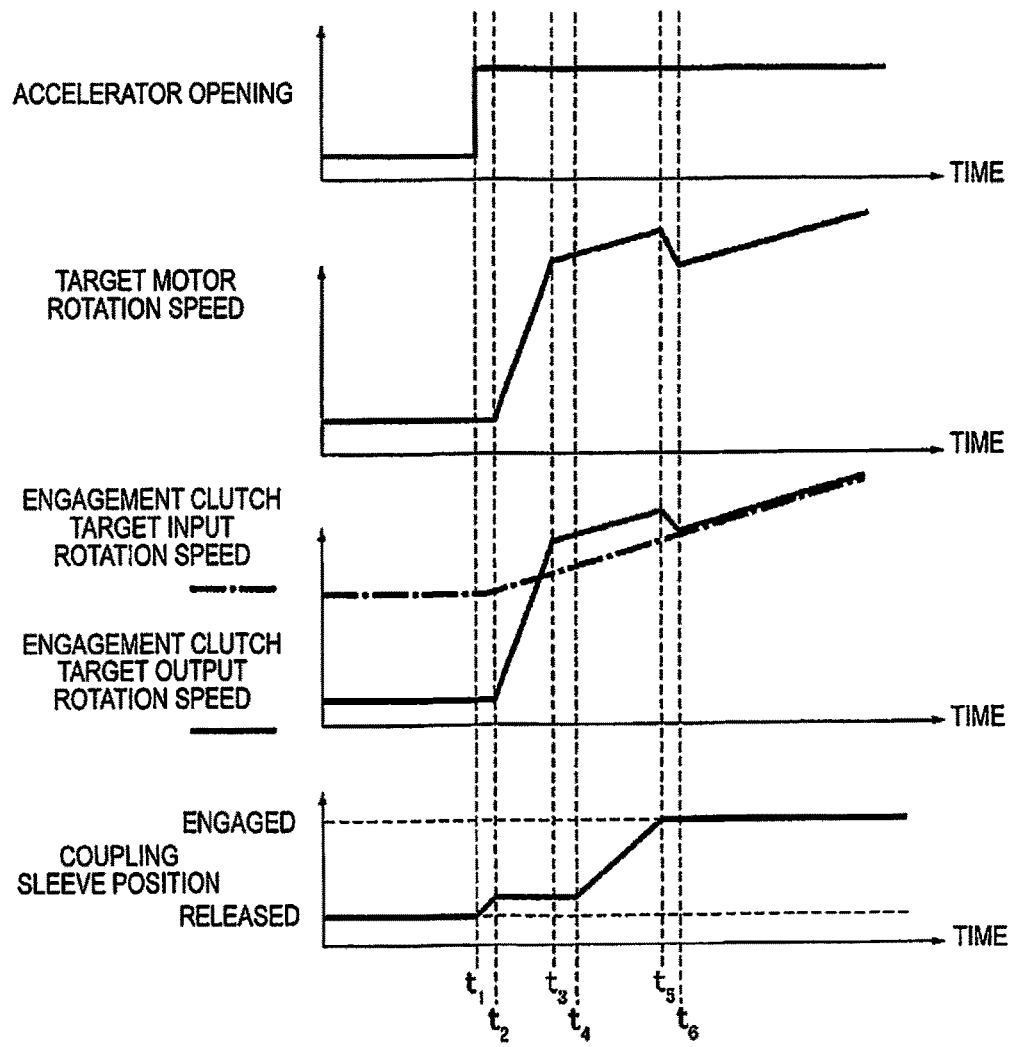
FIG. 6 is a time chart which shows, in the electric vehicle equipped with the control device of the first embodiment during downshifting, each characteristic including an accelerator pedal opening, a target motor rotation speed, a target input rotation speed of the engagement clutch, a target output rotation speed of the engagement clutch, and a coupling sleeve position, respectively.

FIG. 6 is a time chart which shows, in the electric vehicle equipped with the control device of the first embodiment during downshifting, each characteristic including an accelerator pedal opening, a target motor rotation speed, a target input rotation speed of the engagement clutch, a target output rotation speed of the engagement clutch, and a coupling sleeve position, respectively. Below, with reference to FIG. 6, a description is given of the engagement clutch engagement operation in the first embodiment.

Now, it is assumed that, during travel with the high gear stage with the engagement clutch 8c released and the friction clutch 9c friction engaged, at time t shown in FIG. 6, due to rapid increase of the accelerator opening, a shift request for a low gear stage occurs.

Along with the output of the shift request, it is determined YES in step S1 of the flowchart shown in FIG. 4, control proceeds to step S2. As a result, the coupling sleeve 8f of the engagement clutch 8c is stroke driven by the first electric actuator 41, and the coupling sleeve 8f is displaced to a position until just before engagement with the clutch hub 8e.

At time t2, when the coupling sleeve 8f has reached the position immediately before engagement, control proceeds through step S3 to S4, in which the target differential rotation speed of the engagement clutch 8c is set to a predetermined differential rotation speed imparting value. Furthermore, in accordance with the target differential speed, the target motor rotational speed of the driving motor generator 2 is set to achieve the target differential rotation speed.

Note that, since the vehicle is accelerating here, the target motor rotation speed is set such that the motor rotation speed representative of the automatic transmission input rotation speed exceeds the automatic transmission output rotation speed in order for the motor rotation speed to exceed the output rotation speed (cumulative value obtained by multiplying the automatic transmission input rotation speed by gear ratio of the automatic transmission 3). Subsequently, control proceeds to step S5 to thereby execute the motor rotation speed control.

At time t3, when the differential rotation occurs between a target value of the clutch input rotation speed of the engagement clutch 8c and a target value of the clutch output rotation speed, and, at time t4, when it is determined that the actual differential rotation speed has reached the target differential rotation speed, control proceeds through step S6, step S7. Subsequently, the coupling sleeve 8f is stroke driven again to start the displacement toward the engaged position.

Here, the actual differential speed is calculated by subtracting the rotation speed of the transmission output shaft 7 detected by the transmission output speed sensor 34 from the rotation speed of transmission input shaft 6 detected by the motor rotation speed sensor 33.

In a state where the engagement clutch 8c is rotated with a predetermined differential rotation, when the coupling sleeve 8f is stroke driven, in the position immediately before engagement, even when the tip of the spline portion 8fa of the coupling sleeve 8f and the clutch hub 8e and the tip of the clutch teeth 8ea are opposite to each other, the opposite state will be eliminated rapidly.

That is, with respect to the coupling sleeve 8f, since the clutch hub 8e constantly moves relatively, the relative positional relationship between the spline portion 8*fa* and clutch teeth 8*ea* changes from moment to moment.

Thus, the coupling sleeve 8*f* is stroke driven, the relative positional relationship between the spline portion 8*fa* and clutch teeth 8*ea* continues to change until engagement with the clutch hub 8*e* so that the tip of the spline portion 8*fa* may avoid collision with the tip of the clutch teeth 8*ea*. As a result, the coupling sleeve 8*f* and the clutch hub 8*e* can be engaged smoothly so that it is possible to prevent the occurrence of meshing failure in which both components do not mesh with each other.

Also, since the meshing failure is not generated, time is not wasted, such as redoing of the fastening operation would not be generated. Thus, it is possible to shorten the shift time.

Further, at time t5, when the coupling sleeve 8*f* has reached the meshing engagement position, control proceeds through step S8 and step S9, and the target differential rotation speed of the engagement clutch 8*c* will be set to zero. Also, in response to the target differential rotation speed being set to zero, in order to achieve the target differential rotation speed, the target motor rotation speed of the driving motor generator 2 is set.

Here, since the motor rotation speed representative of the transmission input speed has been set to the differential rotation higher than the transmission output rotation speed, the motor rotation speed will be reduced to match the output rotation speed (value of transmission input rotation speed multiplied by the gear ratio after shifting of the automatic transmission 3). Accordingly, the motor rotation speed control is executed.

At time t5 at which both the actual differential rotation speed and the target differential rotation speed have reached zero, it is determined that the meshing engagement of the engagement clutch 8*c* has been completed.

In the first embodiment, before setting the target differential rotation speed of the engagement clutch 8*c*, when the downshift request is output, the coupling sleeve 8*f* of the engagement clutch 8*c* has been previously stroke driven until a position immediately before engagement. In other words, after the relative position of the coupling sleeve 8*f* engaging with the clutch gear 8*d* and the clutch hub 8*e* is place to the position immediately before engagement, the motor rotation speed control is carried out to reach the target differential rotation speed.

Here, in the automatic transmission 3, when the downshift request is output, first, the friction clutch 9*c* that is in frictional engagement is changed to be slip-engaged, and then the engagement operation of engagement clutch 8*c* is carried out. At this time, by stroke driving the coupling sleeve 8*f* in advance to the position immediately before engagement, it is possible to perform the engagement preparation for engaging the clutch 8*c* without waiting for the completion of the slip-engagement of the friction clutch 9*c*. Thus, it is possible to shorten the time until the meshing engagement of the engagement clutch 8*c* is completed. Therefore, it is possible to further shorten the shift time.

Also, in the first embodiment, as shown in FIG. 5, when the vehicle accelerates, the target differential rotation speed which is set at the time of engagement of the engagement clutch 8, the rotation speed of the clutch gear 8*d* representative of the input rotation speed is higher than the rotation speed of the clutch hub 8*e* representative of the output rotation speed. In contrast, when the vehicle is decelerating, the rotation speed of the clutch gear 8*d* is lower than the rotation speed of the clutch hub 8*e*.

Therefore, even if a shock is generated when the engagement clutch 8*c* is coupled, during vehicle acceleration, the engagement shock occurs on the vehicle acceleration side. When the vehicle decelerates, the engagement shock occurs on the vehicle deceleration side. Therefore, it is possible to suppress discomfort associated with shock.

Moreover, in the present first embodiment, as the vehicle acceleration or deceleration of the vehicle increases, the target differential rotation speed is greater. Here, since the target differential rotation speed is greater, the relative displacement speed between the tip of the spline portion 8*fa* of the coupling sleeve 8*f* and the tip of the clutch teeth 8*ea* of the clutch hub 8*e* is faster, and it is possible to perform the engagement operation in the engagement clutch 8*c* quickly. On the other hand, when the target differential rotation speed is smaller, it is possible to suppress a shock (engagement shock) when engaging the coupling sleeve 8*f* with the clutch hub 8*e*.

In other words, by setting the target differential rotation speed greater, as the vehicle acceleration or vehicle deceleration is greater, it is possible to respond appropriately to the request for a quick shift speed by allowing engagement of the engagement clutch 8*c* easier. Also, by setting the target differential rotation speed smaller, as the vehicle acceleration or vehicle deceleration is smaller, it is possible to suppress engagement shock associated with meshing engagement of the engagement clutch 8*c*. Further, it is possible to suppress the engagement shock which is easily recognizable when gently accelerated or decelerated.

Now, a description is given of effects.

According to the control device for the automatic transmission in the first embodiment, the following effects may be obtained.

(1) An automatic transmission control device including an automatic transmission 3 having an engagement clutch 8*c* disposed in a vehicle drive system and, when engaged, operative in meshing engagement as a coupling element and a shift controller 21 that executes a shift control of the automatic transmission 3, wherein the engagement clutch 8*c* includes a first engagement member (clutch gear) 8*d* connected to a transmission input shaft 6 and a second engagement member (clutch hub) 8*e* connected to a transmission output shaft and capable of meshing with the first engagement member 8*d*, and wherein the shift controller 21 is configured, when engaging the engagement clutch 8*c* for shifting (at the time of downshifting) to allow the first engagement member 8*d* and the second engagement member 8*e* to mesh with each other, a target differential rotation speed is set for imparting a predetermined differential rotation between the input rotation speed representative of the rotation speed of the first engagement member 8*d* and the output rotation speed representative of the rotation speed of the second engagement member 8*e*.

Thus, occurrence of meshing failure at the time engaging the engagement clutch may be prevented. Therefore, it is possible to prevent the time until engagement completion from being prolonged.

(2) The shift controller 21 is configured, when engaging the engagement clutch 8*c* for shifting, such that, the input rotation speed of the automatic transmission 3 is controlled to assume the target differential rotation speed after a relative position between the first engagement member (clutch gear) 8*d* and the second engagement member (clutch hub) 8*e* have been brought or set to a position immediately before engagement, Thus, in addition to the effect of (1) described above, it is possible to shorten the time to complete meshing engagement of the engagement clutch 8c to thereby further shorten the shift time.

(3) The shift controller 21 is configured such that the target difference rotation speed may be set to either a state in which the input rotation speed is higher than the output rotation speed, or a state in which the input rotation speed is lower than the output rotation speed.

Thus, in addition to the effect of (1) or (2) described above, it is possible to control the direction of shock occurrence when engaging the engagement clutch 8c (i.e., engagement shock on the vehicle acceleration side or engagement shock on the vehicle deceleration side) to thereby suppress uncomfortable feeling when shifting.

(4) The shift controller 21 is configured, when engaging the engagement clutch for shifting, such that, when the vehicle is decelerating, the input rotation speed is set lower than the output rotation speed.

Thus, in addition to the effect of (3), the engagement shock at the time of engaging the clutch engagement can be generated on the vehicle deceleration side. Therefore, it is possible to suppress the discomfort.

(5) The shift controller 21 is configured, when engaging the engagement clutch for shifting, such that, when the vehicle is accelerating, the input rotation speed is set higher than the output rotation speed.

Thus, in addition to the effect of (3) or (4), the engagement shock at the time of engaging the clutch engagement can be generated on the vehicle acceleration side. Therefore, it is possible to suppress the discomfort.

(6) The shift controller 21 is configured such that the magnitude of the target differential rotation speed is set according to the magnitude of the acceleration acting on the vehicle.

Thus, in addition to the effects of (1) to (5), when controlling, it is possible to compromise the ease of engagement of the engagement clutch 8c with the magnitude of engagement shock that occurs.

(7) The shift controller 21 is configured, when engaging the engagement clutch for shifting, such that, as the vehicle decoration increases, the input rotation speed is set lower than the output rotation speed and the target differential rotation speed increases.

Thus, in addition to the effect of (6) described above, while suppressing the occurrence of engagement shock, it is possible to engage the engagement clutch 8c quickly as needed.

(8) The shift controller 21 is configured, when engaging the engagement clutch for shifting, such that, as the vehicle acceleration increases, the input rotation speed is set higher than the output rotation speed and the target differential rotation speed increases.

Thus, in addition to the effects of (6) or (7) described above, while suppressing the occurrence of engagement shock, it is possible to engage the engagement clutch 8c quickly as needed.

The automatic transmission control device has been described above based on the first embodiment. However, the detailed configurations are not limited to this embodiment. Rather, without departing the gist of inventions each pertaining to respective claim, design change or addition may be acceptable.

In the first embodiment, an example is shown in which the automatic transmission 3 has an engagement clutch 8c and a friction clutch 9c. However, the configuration is not limited to this example. The automatic transmission may include only an engagement clutch as engaging element. Also, in the first embodiment, an example is shown in which the engagement clutch 8c includes a synchronization mechanism. However, the present invention is applicable to a so-called dog clutch which does not include such a synchronization mechanism.

Further, in the first embodiment, a description is given of an example in which the engagement clutch 8c is coupled with the clutch gear 8d representative of a first engagement member meshed with the clutch hub 8e representative of a second engagement member via the coupling sleeve 8f. However, the configuration is not limited to this example. The first engagement member may be directly meshed with the second engagement member.

In addition, in the first embodiment, an example is shown in which the "position immediately before the engagement of the engaging clutch 8c" is intended to describe a position of the clutch hub side tip of the spline portion 8fa of the coupling sleeve 8f assumes a position immediately before overlapping when viewed in the axial direction with the synchro-tooth 8ga of the synchronizer ring 8g. However, the configuration is not limited to this example. For example, in the embodiment in which the first engagement member and the second engagement member are directly meshed with each other without a synchronization mechanism, the position in which a gap between the first engagement member and the second engagement member assumes a negligible, predetermined value may be referred to as the "position immediately before the engagement of the engaging clutch 8c".

In other words, the "position immediately before the engagement of the engaging clutch 8c" is defined as such a position in which the first engagement member (or a member such as the coupling sleeve 8f which is subject to meshing with the first engagement member) and the second engagement member may be meshed in a very short time.

Further, in the first embodiment described above, an example is shown in which the driving source is comprised of only a driving motor/generator 2. However, the driving force is not limited to this configuration. The driving force may include both a motor and an engine, or may be comprised of an engine only.

The invention claimed is:

1. An automatic transmission control device comprising:
an automatic transmission having an engagement clutch disposed in a drive system of a vehicle and capable of meshing engagement as a coupling element; and
a shift controller configured to execute a shift control of the automatic transmission, the engagement clutch including a first engagement member connected to a transmission input shaft and a second engagement member connected to a transmission output shaft and configured to mesh with the first engagement member, the shift controller being configured, when engaging the engagement clutch for shifting, to enable the first engagement member and the second engagement member to mesh with each other, to set a target differential rotation speed to impart a predetermined differential rotation between an input rotation speed representative of a rotation speed of the first engagement member and an output rotation speed representative of a rotation speed of the second engagement member, and configured to set the target differential rotation speed to one of a state in which the input rotation speed is higher than the output rotation speed, and a state in which the input rotation speed is lower than the output rotation speed, and, when engaging the engagement clutch for shifting and the vehicle is decelerating, configured to set the input rotation speed lower than the output rotation speed.

2. The automatic transmission control device as claimed in claim 1, wherein
the shift controller is configured, when engaging the engagement clutch for shifting, to control the input rotation speed of the automatic transmission to assume the target differential rotation speed after a relative position between the first engagement member and the second engagement member are brought to a position immediately before engagement.

3. An automatic transmission control device, comprising:
an automatic transmission having an engagement clutch disposed in a drive system of a vehicle and capable of meshing engagement as a coupling element; and
a shift controller configured to execute a shift control of the automatic transmission, the engagement clutch including a first engagement member connected to a transmission input shaft and a second engagement member connected to a transmission output shaft and configured to mesh with the first engagement member, the shift controller being configured, when engaging the engagement clutch for shifting, to enable the first engagement member and the second engagement member to mesh with each other, to set a target differential rotation speed to impart a predetermined differential rotation between an input rotation speed representative of a rotation speed of the first engagement member and an output rotation speed representative of a rotation speed of the second engagement member, and, the shift controller being configured to set the magnitude of the target differential rotation speed according to a magnitude of acceleration acting on the vehicle.

4. The automatic transmission control device as claimed in claim 3, wherein
the shift controller is configured, when engaging the engagement clutch for shifting, as the vehicle deceleration increases, to set the input rotation speed lower than the output rotation speed and to increase the target differential rotation speed.

5. The automatic transmission control device as claimed in claim 4, wherein
the shift controller is configured, when engaging the engagement clutch for shifting, as the vehicle acceleration increases, to set the input rotation speed higher than the output rotation speed and to increase the target differential rotation speed.

6. The automatic transmission control device as claimed in claim 4, wherein
the shift controller is configured, when engaging the engagement clutch for shifting, to control the input rotation speed of the automatic transmission to assume the target differential rotation speed after a relative position between the first engagement member and the second engagement member are brought to a position immediately before engagement.

7. The automatic transmission control device as claimed in claim 3, wherein
the shift controller is configured, when engaging the engagement clutch for shifting, as the vehicle acceleration increases, to set the input rotation speed higher than the output rotation speed and to increase the target differential rotation speed.

8. The automatic transmission control device as claimed in claim 7, wherein
the shift controller is configured, when engaging the engagement clutch for shifting, to control the input rotation speed of the automatic transmission to assume the target differential rotation speed after a relative position between the first engagement member and the second engagement member are brought to a position immediately before engagement.

9. The automatic transmission control device as claimed in claim 3, wherein
the shift controller is configured, when engaging the engagement clutch for shifting, to control the input rotation speed of the automatic transmission to assume the target differential rotation speed after a relative position between the first engagement member and the second engagement member are brought to a position immediately before engagement.

10. An automatic transmission control device, comprising:
an automatic transmission having an engagement clutch disposed in a drive system of a vehicle and capable of meshing engagement as a coupling element; and
a shift controller configured to execute a shift control of the automatic transmission, the engagement clutch including a first engagement member connected to a transmission input shaft and a second engagement member connected to a transmission output shaft and configured to mesh with the first engagement member, the shift controller being configured, when engaging the engagement clutch for shifting, to enable the first engagement member and the second engagement member to mesh with each other, to set a target differential rotation speed to impart a predetermined differential rotation between an input rotation speed representative of a rotation speed of the first engagement member and an output rotation speed representative of a rotation speed of the second engagement member, and, configured to set the target differential rotation speed to one of a state in which the input rotation speed is higher than the output rotation speed, and a state in which the input rotation speed is lower than the output rotation speed, and, when engaging the engagement clutch for shifting, and the vehicle is accelerating, to set the input rotation speed higher than the output rotation speed.

11. The automatic transmission control device as claimed in claim 10, wherein
the shift controller is configured, when engaging the engagement clutch for shifting, to control the input rotation speed of the automatic transmission to assume the target differential rotation speed after a relative position between the first engagement member and the second engagement member are brought to a position immediately before engagement.

* * * * *